US009851812B2

(12) United States Patent
Baldwin

(10) Patent No.: US 9,851,812 B2
(45) Date of Patent: Dec. 26, 2017

(54) SYSTEMS AND METHODS FOR PROVIDING FUNCTIONALITY BASED ON DEVICE ORIENTATION

(71) Applicant: Facebook, Inc., Menlo Park, CA (US)

(72) Inventor: Robert Michael Baldwin, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 177 days.

(21) Appl. No.: 14/472,137

(22) Filed: Aug. 28, 2014

(65) Prior Publication Data
US 2016/0062483 A1    Mar. 3, 2016

(51) Int. Cl.
*G06F 3/0346* (2013.01)
*H04L 12/58* (2006.01)
*G06Q 20/32* (2012.01)
*H04W 4/02* (2009.01)
*H04W 4/20* (2009.01)
*H04M 1/725* (2006.01)

(52) U.S. Cl.
CPC ....... *G06F 3/0346* (2013.01); *G06Q 20/3221* (2013.01); *H04L 51/20* (2013.01); *H04L 51/24* (2013.01); *H04M 1/72569* (2013.01); *H04W 4/026* (2013.01); *H04W 4/206* (2013.01)

(58) Field of Classification Search
CPC ......... H04L 51/24; H04L 51/20; H04L 67/22; G06Q 20/3221; G06F 3/0346
See application file for complete search history.

(56) References Cited

U.S. PATENT DOCUMENTS

| | | | |
|---|---|---|---|
| 8,340,691 B1* | 12/2012 | Starenky | G01C 21/28 455/404.2 |
| 8,589,488 B2 | 11/2013 | Huston et al. | |
| 2005/0212767 A1 | 9/2005 | Marvit et al. | |
| 2008/0030474 A1* | 2/2008 | Toyokura | G06F 1/1624 345/169 |
| 2010/0069115 A1 | 3/2010 | Liu | |
| 2012/0262372 A1* | 10/2012 | Kim | G06F 1/1694 345/158 |
| 2013/0239063 A1* | 9/2013 | Ubillos | H04L 51/24 715/838 |

(Continued)

FOREIGN PATENT DOCUMENTS

EP    2144139 A1    1/2010

OTHER PUBLICATIONS

International Application No. PCT/US2014/053590, International Search Report and Written Opinion dated Apr. 24, 2015.

(Continued)

*Primary Examiner* — Abbas Abdulselam
(74) *Attorney, Agent, or Firm* — Sheppard Mullin Richter & Hampton LLP

(57) ABSTRACT

Systems, methods, and non-transitory computer-readable media can determine a first orientation in which a computing system is positioned. A first functionality can be provided when the computing system is positioned in the first orientation. It can be determined that the computing system becomes positioned in a second orientation. A second functionality can be selected, out of a set of functionalities, based on a current state associated with the computing system. The second functionality can be provided when the computing system becomes positioned in the second orientation.

20 Claims, 14 Drawing Sheets

(56) References Cited

U.S. PATENT DOCUMENTS

2013/0262588 A1* 10/2013 Barak .................... H04L 67/22
                                                    709/204
2014/0040959 A1    2/2014 Oyman
2014/0129949 A1    5/2014 Singer
2014/0181715 A1    6/2014 Axelrod et al.
2014/0337791 A1* 11/2014 Agnetta ................ G06F 3/0481
                                                    715/784
2015/0194133 A1*  7/2015 Lin ...................... G06T 3/0006
                                                    345/659

OTHER PUBLICATIONS

European Patent Application No. 15156346.7, Search Report dated Feb. 9, 2016.

* cited by examiner

SYSTEMS AND METHODS FOR PROVIDING FUNCTIONALITY BASED ON DEVICE ORIENTATION

FIELD OF THE INVENTION

The present technology relates to the field of providing functionality from a computing device. More particularly, the present technology relates to techniques for providing functionality based on device orientation.

BACKGROUND

Today, people often utilize computing devices (or systems) for a wide variety of purposes. Users can use their computing devices, for example, to interact with one another, access content, share content, and create content. In some cases, a user of a social networking system (or service) can utilize his or her computing device to provide, post, share, and access various content items, such as status updates, links, images, and videos, via the social networking system.

Often times, the size of a display screen of a computing device is limited. Accordingly, text, images, and other content usually have to compete for space to be displayed on the screen. Under conventional approaches, different types of computing device functionality can use up display screen space ineffectively. In some cases, conventional approaches to providing input elements such as text boxes, visualizations such as images, and other functionality requiring display screen space can be performed inefficiently. As such, conventional approaches can create challenges for or reduce the overall user experience associated with providing content and other device functionality.

SUMMARY

Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Various embodiments of the present disclosure can include systems, methods, and non-transitory computer readable media configured to determine a first orientation in which a computing system is positioned. A first functionality can be provided when the computing system is positioned in the first orientation. It can be determined that the computing system becomes positioned in a second orientation. A second functionality can be selected, out of a set of functionalities, based on a current state associated with the computing system. The second functionality can be provided when the computing system becomes positioned in the second orientation.

In an embodiment, the first orientation can correspond to a portrait orientation and the second orientation can correspond to a landscape orientation. In an embodiment, the first orientation can correspond to the landscape orientation and the second orientation can correspond to the portrait orientation.

In an embodiment, the current state associated with the computing system can include at least one of a current context associated with an application running on the computing system or a current context associated with an operating system running on the computing system.

In an embodiment, at least a first subset out of the set of functionalities can be associated with content production and at least a second subset out of the set of functionalities can be associated with content consumption.

In an embodiment, the first functionality can be associated with an input element for creating a post on a social networking system and the second functionality can be associated with a camera mode for producing an image to be included in the post.

In an embodiment, the first functionality can be associated with an input element for creating a post on a social networking system and the second functionality can be associated with at least one of adding a location tag to the post, adding a user tag to the post, applying facial recognition to the post, or utilizing rich-text editing for the post.

In an embodiment, the first functionality can be associated with accessing a content item in a first view and the second functionality can be associated with accessing the content item in a second view. In some instances, the second view can provide more information associated with the content item than the first view.

In an embodiment, the first functionality can be associated with a financial transaction and the second functionality can be associated with providing at least one of a receipt, a business card, or a communication expressing gratitude.

In an embodiment, the first functionality can be associated with accessing a message in an inbox and the second functionality can be associated with providing at least one of the message, the inbox, or a message thread of which the message is a part.

In an embodiment, the first functionality can be associated with accessing a first content item in a first view and the second functionality can be associated with providing the first content item and at least one tab for switching to a second view to access a second content item.

In an embodiment, the first functionality can be associated with a search and the second functionality can be associated with providing a set of results based on the search. In some cases, the providing of the set of results can include providing at least a first subset of results associated with a first search result type and a second subset of results associated with a second search result type.

In an embodiment, the first functionality can be associated with providing a link to a web resource and the second functionality can be associated with initiating a loading of the web resource via the link.

In an embodiment, it can be determined that the computing system becomes positioned in the first orientation subsequent to the providing of the second functionality. A third functionality can be selected based on the second functionality. The third functionality can be provided when the computing system becomes positioned in the first orientation subsequent to the providing of the second functionality.

In an embodiment, the third functionality can be associated with initiating a loading of an image, produced in a camera mode associated with the second functionality, to be included in a post to a social networking system. In some instances, a creation of the post can be initiated based on the first functionality.

In an embodiment, the third functionality can be associated with at least one of a back instruction, a cancel instruction, an ignore instruction, a quit instruction, an escape instruction, or an exit instruction.

In an embodiment, a direction associated with a change in orientation experienced by the computing system, when the computing system becomes positioned in the second orientation subsequent to being positioned in the first orientation, can be determined. In some instances, the selecting of the second functionality can be based on the direction.

In an embodiment, at least one of the first orientation or the second orientation can be determined based on one or more orientation sensors of the computing system.

In an embodiment, the one or more orientation sensors can include at least one of an accelerometer, a gyroscope, a compass, a barometer, a magnetometer, or a motion processor.

In a further embodiment according to the invention, one or more computer-readable non-transitory storage media embody software that is operable when executed to perform a method according to the invention or any of the above mentioned embodiments.

In a further embodiment according to the invention, a system comprises: one or more processors; and at least one memory coupled to the processors and comprising instructions executable by the processors, the processors operable when executing the instructions to perform a method according to the invention or any of the above mentioned embodiments.

In a further embodiment according to the invention, a computer program product, preferably comprising a computer-readable non-transitory storage media, is operable when executed on a data processing system to perform a method according to the invention or any of the above mentioned embodiments.

Many other features and embodiments of the invention will be apparent from the accompanying drawings and from the following detailed description.

Figure 1:
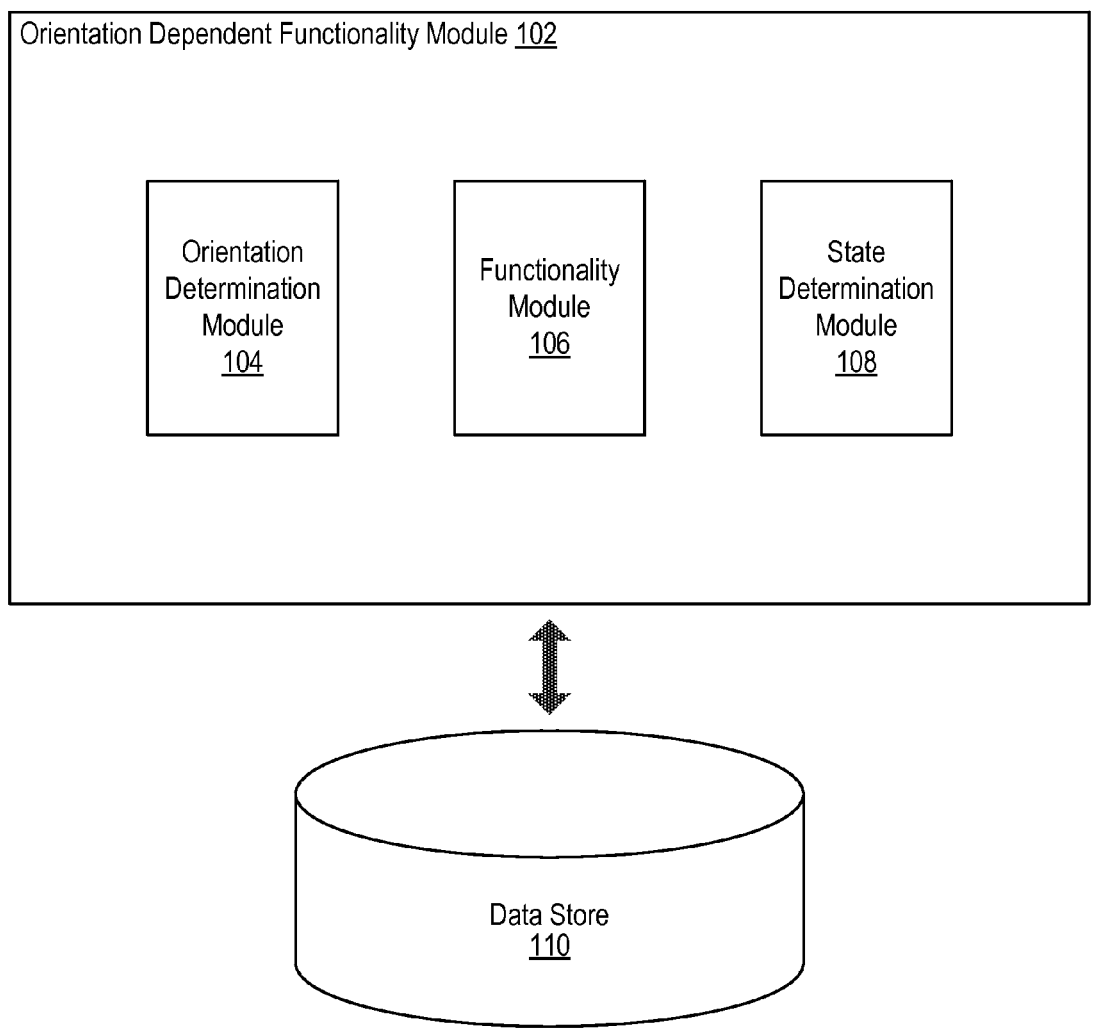
FIG. 1 illustrates an example system including an example orientation dependent functionality module configured to facilitate providing functionality based on device orientation, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Providing Functionality Based on Device Orientation

People use computing devices (or systems) for various purposes. Computing devices can provide different kinds of functionality. Users can utilize their computing devices to produce content, such as by writing articles, taking pictures, or recording videos. Users can also use their computing devices to consume content, such as by reading articles, viewing media, or accessing web resources (e.g., web sites, online services, etc.). In some cases, users of a social networking system (or service) can use their computing devices to communicate or interact with other users as well as to create content, provide content, share content, and/or access content, via the social networking system.

Under conventional approaches, providing functionality on a computing device can require the use of a display screen of the computing device. Accordingly, different types of functionality or features provided on the computing device must often share display space on the display screen. However, display space on the display screen of the computing device can often times be limited. In some cases, conventional approaches can inefficiently provide functionality or features that require display space.

Therefore, an improved approach to providing device or system functionality can be beneficial for addressing or alleviating various concerns associated with conventional approaches. Various embodiments of the present disclosure can provide functionality based on an orientation of the computing device or system. In some embodiments, the disclosed technology can utilize one or more orientation sensors to determine a first orientation in which the computing system is positioned. A first functionality can be provided when the computing system is positioned in the first orientation. It can be determined that the computing system becomes positioned in a second orientation. A second functionality can be selected, out of a set of functionalities, based on a current state associated with the computing system. The second functionality can be provided when the computing system becomes positioned in the second orientation.

FIG. 1 illustrates an example system 100 including an example orientation dependent functionality module 102 configured to facilitate providing functionality based on device (or system) orientation, according to an embodiment of the present disclosure. In some implementations, the orientation dependent functionality module 102 can include an orientation determination module 104, a functionality module 106, and a state determination module 108. The example system 100 can also include at least one data store 110.

The at least one data store 110 can be configured to store and maintain various types of data. In some implementations, the at least one data store 110 can store information associated with a social networking system (or service), such as the social networking system 930 of FIG. 9. The information associated with the social networking system can include data about users, social connections, social interactions, locations, maps, places, events, groups, posts, communications, media, content, account settings, privacy settings, and various other types of data. As shown in the example system 100, in some embodiments, the orientation dependent functionality module 102 can be configured to communicate or operate with the at least one data store 110.

Moreover, the orientation determination module 104 can be configured to facilitate determining an orientation in which a computing system is positioned. Similar to other modules of the disclosed technology, in some embodiments, the orientation determination module 104 can be implemented as hardware, software, or any combination thereof. For example, in some implementations, the orientation determination module 104 can include one or more orientation sensors. In another example, the one or more orientation sensors can be implemented outside of the orientation determination module 104 but can reside on or within the computing system.

The orientation determination module 104 can utilize or operate in conjunction with the one or more orientation sensors to determine an orientation in which the computing system is positioned. In some cases, the orientation determination module 104 can determine that the computing system is positioned in a portrait (or vertical) orientation. In some instances, the orientation determination module 104 can determine that the computing system is positioned in a landscape (or horizontal) orientation. Further, the orientation determination module 104 can determine a change in orientation experienced by the computing system. For example, the orientation determination module 104 can determine that the computing system had been positioned in one orientation and has become positioned in another orientation.

In some embodiments, the one or more orientation sensors can include, but are not limited to, at least one of an accelerometer, a gyroscope, a compass, a barometer, a magnetometer, a motion processor (e.g., a motion co-processor), or any combination thereof.

Additionally, the functionality module 106 can be configured to facilitate providing functionality based on the orientation of the computing system. In some instances, the functionality module 106 can be configured to facilitate providing functionality based on a current state associated with the computing system. For example, the functionality module 106 can provide a functionality that is selected, out of a set of functionalities, based on the orientation and/or the current state associated with the computing system. The functionality module 106 will be discussed in more detail with reference to FIG. 2.

In some embodiments, the current state associated with the computing system can be determined, identified, acquired, and/or provided by the state determination module 108. More details related to the state determination module 108 will be provided with reference to FIG. 3.

Moreover, in some embodiments, the orientation determination module 104 can facilitate determining a direction associated with a change in orientation experienced by the computing system when the computing system becomes positioned in a latter orientation subsequent to being positioned in a former orientation. In some cases, the selecting of a functionality to be provided by the computing system can be based on the direction (e.g., clockwise, counterclockwise, etc.).

Figure 2:
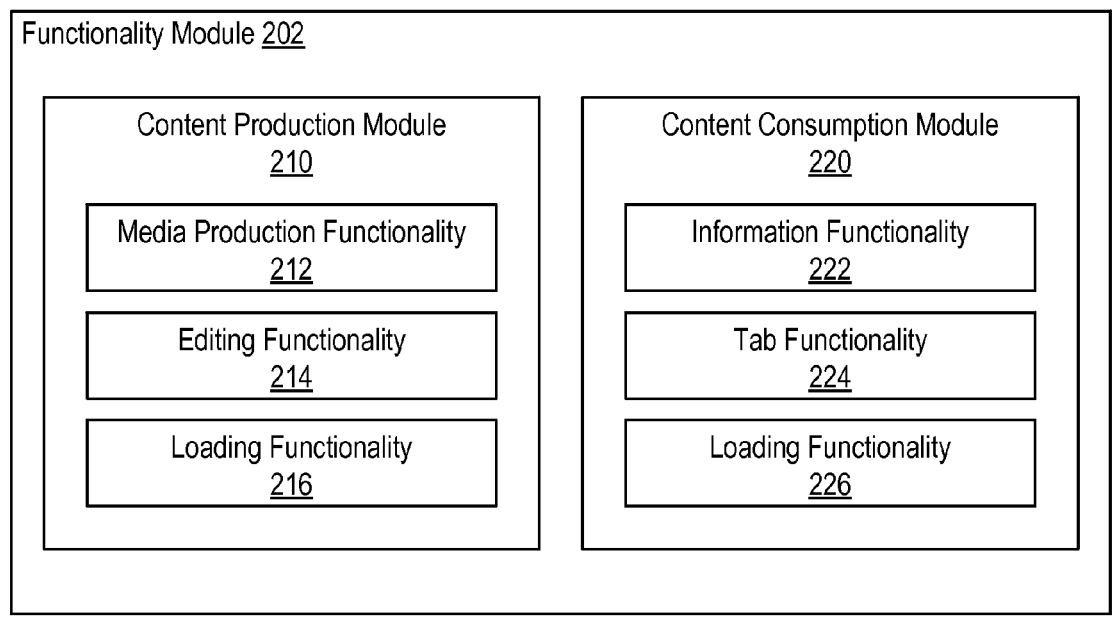
FIG. 2 illustrates an example functionality module configured to facilitate providing functionality based on device orientation, according to an embodiment of the present disclosure.

FIG. 2 illustrates an example functionality module 202 configured to facilitate providing functionality based on device orientation, according to an embodiment of the present disclosure. In some embodiments, the functionality module 106 of FIG. 1 can be implemented as the example functionality module 202. In some cases, the example functionality module 202 can include a content production module 210 and a content consumption module 220, as shown in the example of FIG. 2.

As discussed above, the functionality module 202 can be configured to facilitate providing functionality based on the orientation of a computing system. For example, the functionality module 202 can select and provide at least a first functionality when the computing system is determined to be in a first orientation, and can select and provide at least a second functionality when the computing system is determined to be in a second orientation. In some cases, the functionality module 202 can be configured to provide a functionality that is selected, out of a set of functionalities, based on the orientation and/or a current state associated with the computing system. In some instances, the set of functionalities can include a subset of functionalities associated with content production as well as another subset of functionalities associated with content consumption.

In the example of FIG. 2, the content production module 210 can be configured to provide the subset of functionalities associated with content production. The subset of functionalities associated with content production can include, but is not limited to, a media production functionality 212, an editing functionality 214, and a loading functionality 216. It is appreciated that many variations are possible.

The media production functionality 212 can be associated with acquiring, creating, and/or providing media content items. Examples of media content items can include, but are not limited to, images, videos, audio, and/or text, etc. In one example, the media production functionality 212 can include a functionality of producing a status update or a post at a social networking system using one or more keyboards (e.g., virtual keyboards, digital keyboards, etc.) of the computing system. In another example, the media production functionality 212 can include a functionality of capturing images or recording videos using one or more cameras of the computing system.

The editing functionality 214 can be associated with developing, modifying, and/or revising content, such as media content items and other content items. In one example, the editing functionality 214 can correspond to editing images, videos, audios, and/or text, etc. In another example, the editing functionality 214 can correspond to adding or editing one or more properties or metadata (e.g., tags, descriptions, dates, locations, etc.) associated with a particular content item. The editing functionality 214 can include, for example, a functionality of applying facial recognition to the particular content item to detect and/or recognize one or more faces included with the particular content item. Furthermore, in some instances, the editing functionality 214 can include a functionality of rich-text editing, which can include changing font styles, font sizes, font colors, symbols, etc.

The loading functionality 216 can be associated with a functionality of loading content that has been produced or provided. In some cases, the loading functionality 216 can correspond to a loading of an image, video, or other content item that has been produced or provided. For example, the loading functionality 216 can include initiating a loading of a captured image to be included or attached as part of a post to the social networking system. In another example, the loading functionality 216 can include initiating a loading of a captured image to be included or attached as part of a message to be sent.

Additionally, in the example of FIG. 2, the content consumption module 220 can be configured to provide the subset of functionalities associated with content consumption. The subset of functionalities associated with content consumption can include, but is not limited to, an information functionality 222, a tab functionality 224, and a loading functionality 226. Again, it is contemplated that there can be many variations.

The information functionality 222 can correspond to a functionality of providing information about or otherwise related to content that is being consumed (e.g., viewed, played, accessed, etc.). In some cases, different types and/or amounts of information can be provided under different circumstances. For example, when the computing system is in a first orientation, certain information can be provided. When the computing system becomes positioned in a second orientation, different information can be provided.

The tab functionality 224 can correspond to a functionality of providing one or more tabs, such as for navigating an interface through which content is consumed. In some instances, each tab can provide access to a respective set of content items or information to be consumed. In one example, content can be consumed at a social networking system user's profile page or timeline. A first tab on the profile page or timeline can provide access to information about the user. In this example, a second tab can provide access to one or more media content items associated with the user. A third tab can provide information about the user's friends or social connections within the social networking system. In another example, content to be consumed can include results produced from a search or query. The tab functionality 224 can be associated with providing different types of search results (e.g., web results, image results, news results, etc.) via different tabs.

The loading functionality 226 can correspond to a functionality of initiating a loading of content to be consumed. In one example, the loading functionality 226 can include loading an image, video, or other content item to be consumed. In another example, the loading functionality 226 can be associated with loading a web resource accessible via a link or web address.

In some embodiments, the loading functionality 226 associated with content consumption can be substantially the same as or similar to the loading functionality 216 associated with content production. In some embodiments, the loading functionality 226 associated with content consumption can be different or separate from the loading functionality 216 associated with content production. It should be understood that many variations are possible.

Figure 3:
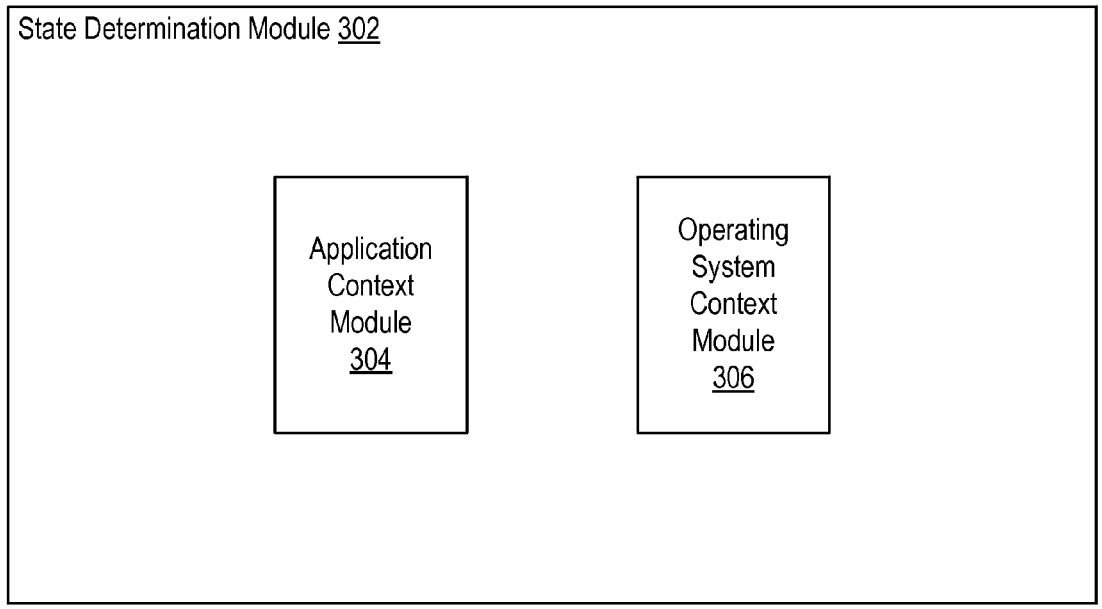
FIG. 3 illustrates an example state determination module configured to facilitate providing functionality based on device orientation, according to an embodiment of the present disclosure.

FIG. 3 illustrates an example state determination module 302 configured to facilitate providing functionality based on device orientation, according to an embodiment of the present disclosure. In some embodiments, the state determination module 108 of FIG. 1 can be implemented as the example functionality module 302. As shown in the example of FIG. 3, the functionality module 302 can include an application context module 304 and an operating system context module 306.

As discussed previously, the state determination module 302 can be configured to acquire, determine, recognize, and/or identity a state, such as a current state, associated with a computing system. In some instances, the current state associated with the computing system can include at least one of a current context associated with an application running on the computing system or a current context associated with an operating system running on the computing system.

The application context module 304 can be configured to acquire, determine, recognize, and/or identity a context, such as the current context, associated with an application running on the computing system. The current context associated with the application can indicate a state, a stage, a step, a process, an operation, and/or a task that is currently being performed or experienced by the application running on the computing system.

In one example, the current context of the application can indicate which application interface or portion thereof with which a user of the application is currently interacting. In another example, the current context of the application can indicate which functionality(ies) the application is currently providing. In a further example, the current context of the application can provide up-to-date information about the application in real-time (or near real-time). In some embodiments, one or more functionalities provided by the computing system can be based on the current context of the application.

The operating system context module 306 can be configured to acquire, determine, recognize, and/or identity a context, such as the current context, associated with an operating system running on the computing system. The current context associated with the operating system can indicate a state, a stage, a step, a process, an operation, and/or a task that is currently being performed or experienced by the operating system running on the computing system.

In one example, the current context of the operating system can indicate which operating system interface or portion thereof a user of the operating system is currently utilizing. In another example, the current context of the operating system can indicate which functionality(ies) or feature(s) the operating system is currently providing. In a further example, the current context of the operating system can provide up-to-date information about the operating system in real-time (or near real-time). In some embodiments, one or more functionalities provided by the computing system can be based on the current context of the operating system.

Figure 4A:
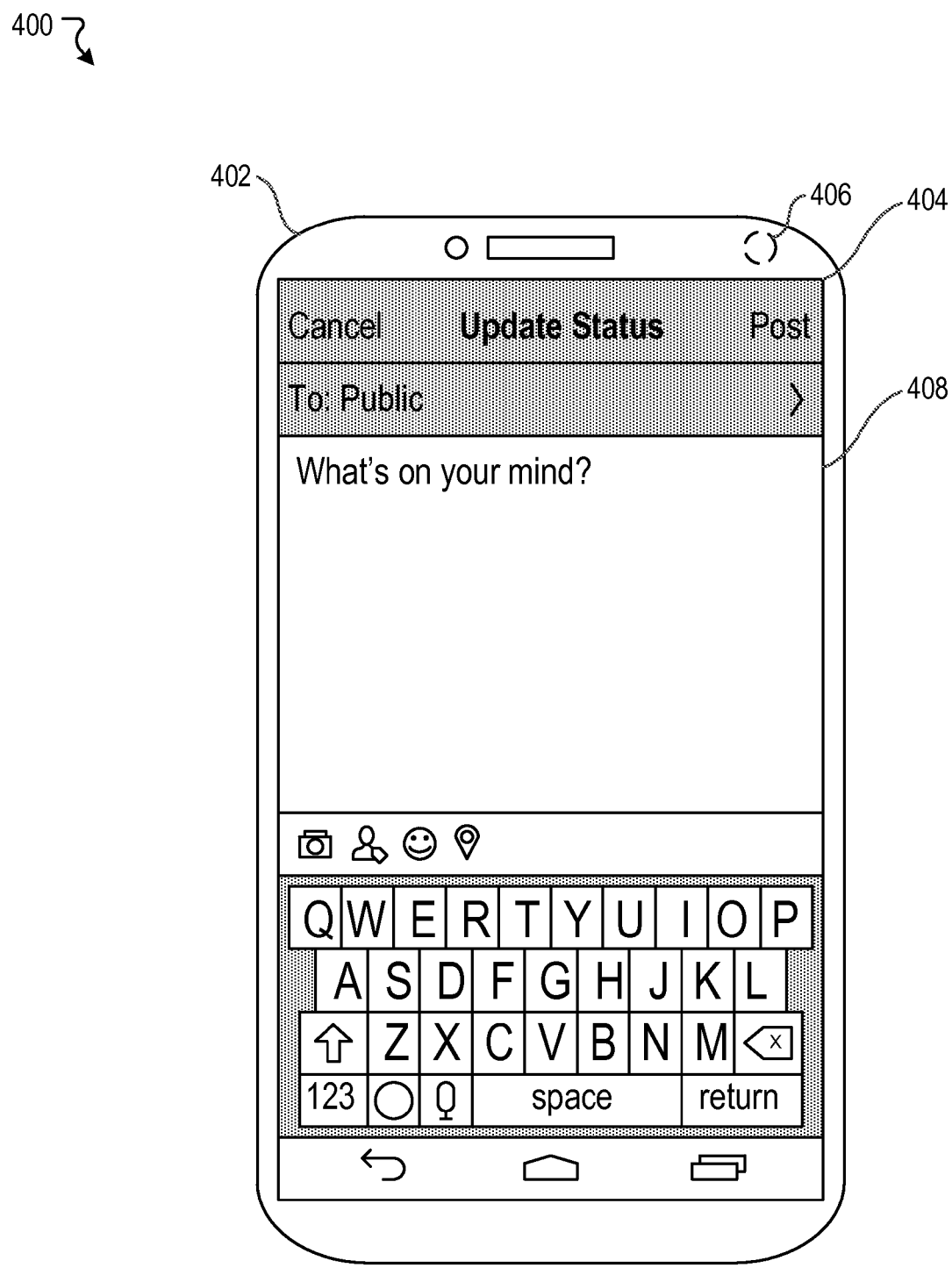
FIG. 4A illustrates an example scenario associated with providing functionality based on device orientation, according to an embodiment of the present disclosure.

FIG. 4A illustrates an example scenario 400 associated with providing functionality based on device orientation, according to an embodiment of the present disclosure. The example scenario 400 can involve an example computing device or system 402 configured to provide functionality based on device orientation.

In the example scenario 400, the computing system 402 can include a display screen 404 and one or more cameras, such as a rear-facing camera 406. The computing system 402 can also be positioned in a first orientation. As shown, the first orientation can correspond to a portrait (or vertical) orientation. In this example, while positioned in the first orientation, the computing system 402 can provide a first functionality which corresponds to providing, on the display screen 404, an input element (e.g., text box) 408 for creating a post on a social networking system.

Figure 4B:
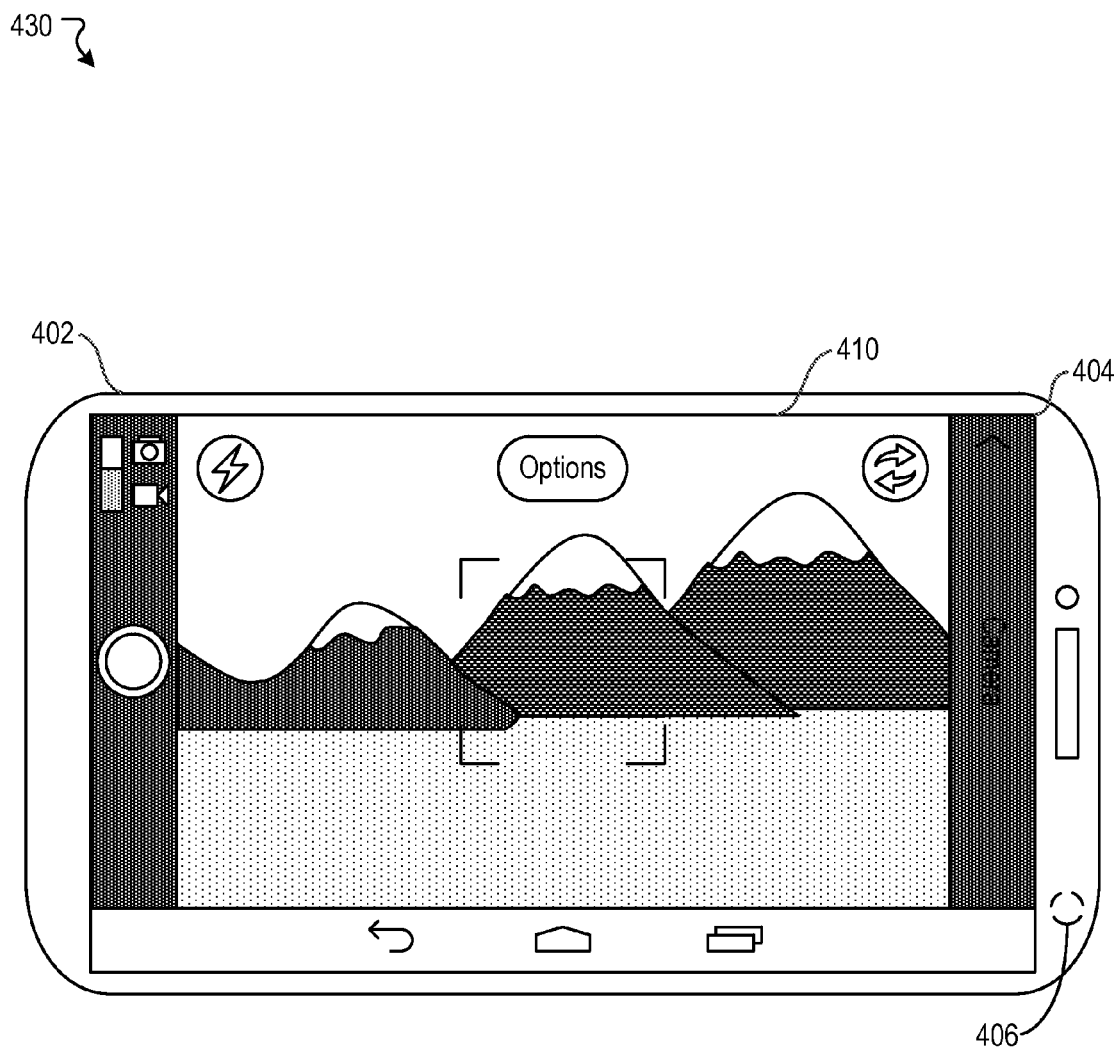
FIG. 4B illustrates an example scenario associated with providing functionality based on device orientation, according to an embodiment of the present disclosure.

FIG. 4B illustrates an example scenario 430 associated with providing functionality based on device orientation, according to an embodiment of the present disclosure. In FIG. 4B, the computing system 402 of FIG. 4A has experienced or undergone a change in orientation such that the computing system 402 is now positioned in a second orientation. As shown in FIG. 4B, the second orientation can correspond to a landscape (or horizontal) orientation. While being positioned in the second orientation, the computing system 402 can provide a second functionality. In this example, the second functionality can be associated with a camera mode 410 for producing an image to be included in the post on the social networking system. As shown in the example scenario 430, the camera mode 410 can provide, on the display screen 404, a camera view of the rear-facing camera 406 as well as other camera mode interface elements for capturing images or recording videos, which can be included in the post. A user can use the camera mode 410 to capture an image. Moreover, in some embodiments, the camera mode 410 can be enabled immediately or near-instantaneously when the computing system 402 is positioned in the second orientation. For example, the camera mode 410 can be activated immediately or near-instantaneously when it is detected that the computing system 402 becomes positioned in the second orientation. Furthermore, in some implementations, the computing system 402 can automatically capture one or more images in the camera mode 410, which can be initiated, activated, or enabled when the computing system 402 is in the second orientation.

Figure 4C:
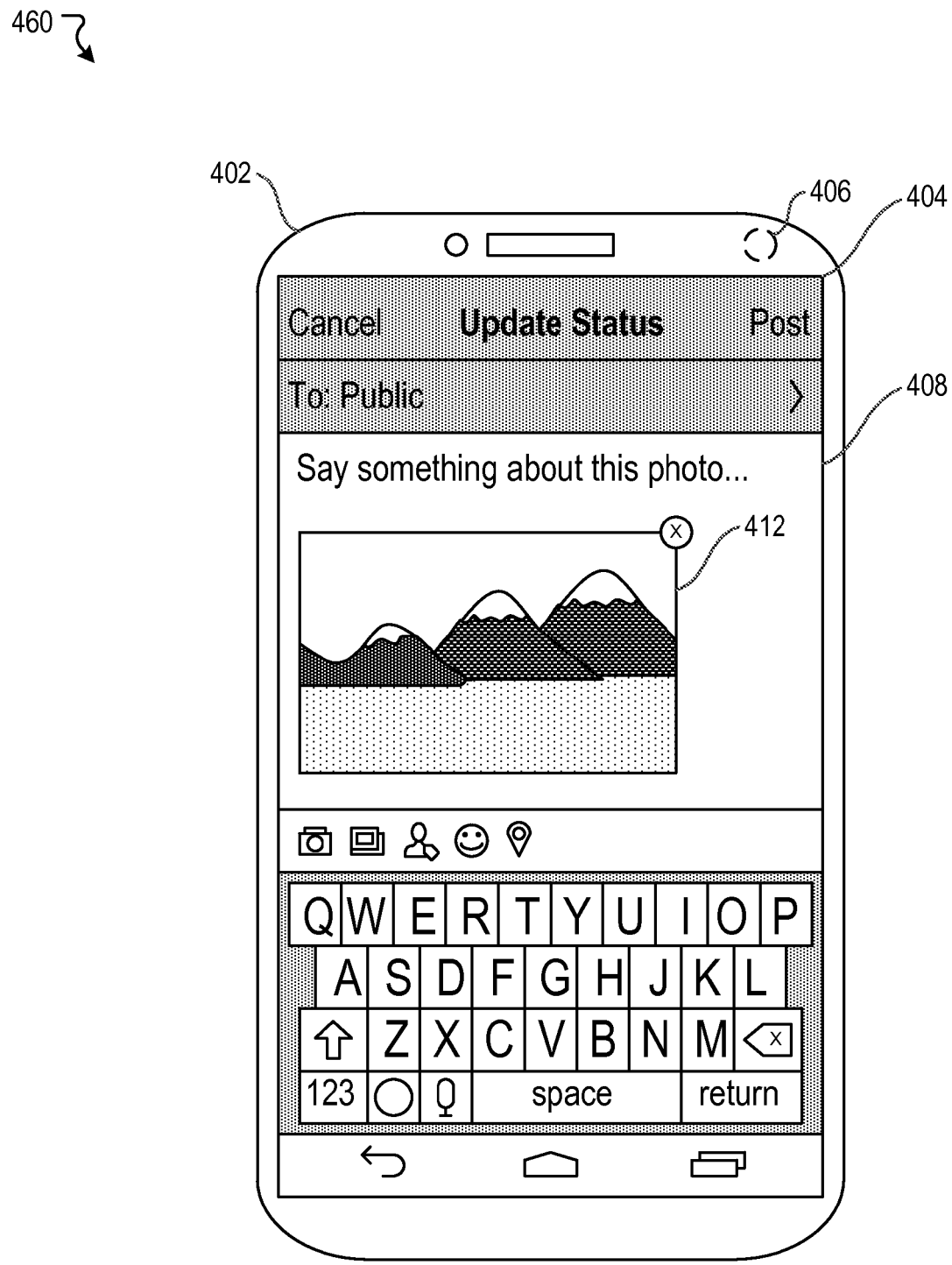
FIG. 4C illustrates an example scenario associated with providing functionality based on device orientation, according to an embodiment of the present disclosure.

FIG. 4C illustrates an example scenario 460 associated with providing functionality based on device orientation, according to an embodiment of the present disclosure. The example scenario 460 illustrates the computing system 402 of FIG. 4B having experienced or undergone another change in orientation such that the computing system 402 has now reverted back to the first orientation, which can correspond to the portrait orientation. Having reverted back to the first orientation subsequent to capturing the image in the camera mode (second functionality), the computing system 402 can select and provide a third functionality. In this example, since the image was previously captured in the camera mode (second functionality), the third functionality can be selected to correspond to initiating a loading of the image for inclusion or attachment 412 with the post to the social networking system.

Moreover, it should be appreciated that many variations are possible. In one example, the first functionality can be provided when the computing system is positioned in the first orientation and the first functionality can be associated with an input element 408 for creating the post for the social networking system, as discussed above. As shown in FIG. 4A, there may be limited display space on the display screen 404 to efficiently, effectively, or comfortably provide additional functionality or features that require more display space. In this example, although not explicitly illustrated, the second functionality provided in the second orientation can be associated with providing at least one of an option to add a location tag to the post, an option to add a user tag to the post, an option to apply facial recognition to the post, or an option to utilize rich-text editing for the post.

Figure 5A:
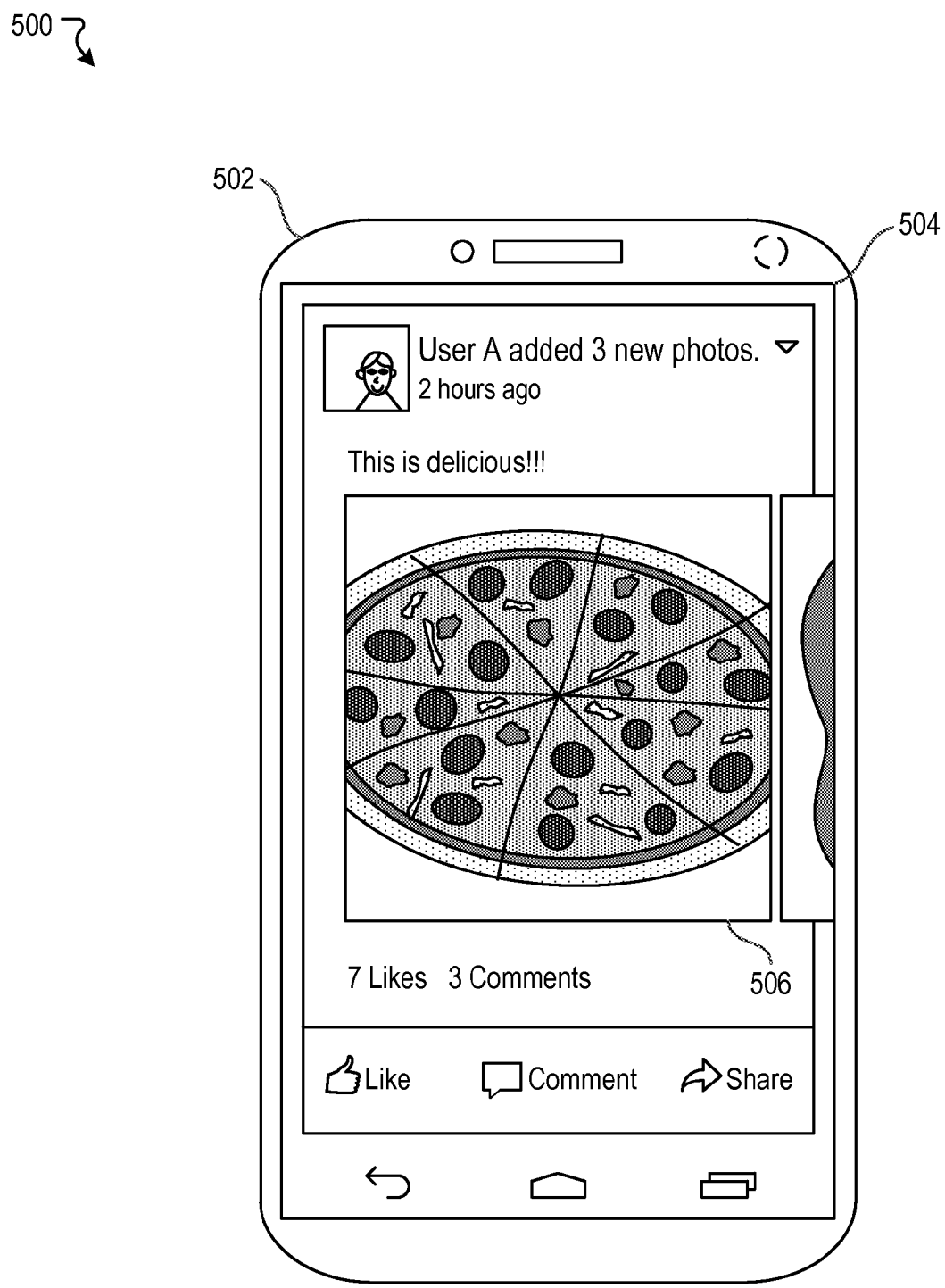
FIG. 5A illustrates an example scenario associated with providing functionality based on device orientation, according to an embodiment of the present disclosure.

FIG. 5A illustrates an example scenario 500 associated with providing functionality based on device orientation, according to an embodiment of the present disclosure. The example scenario 500 involves an example computing device or system 502 which can include a display screen 504. The computing system 502 can provide a first functionality while in a first orientation, such as a portrait orientation. In this example scenario 500, the first functionality can be associated with accessing a content item (e.g., an image of a pizza) in a first view 506 on the display screen 504.

Figure 5B:
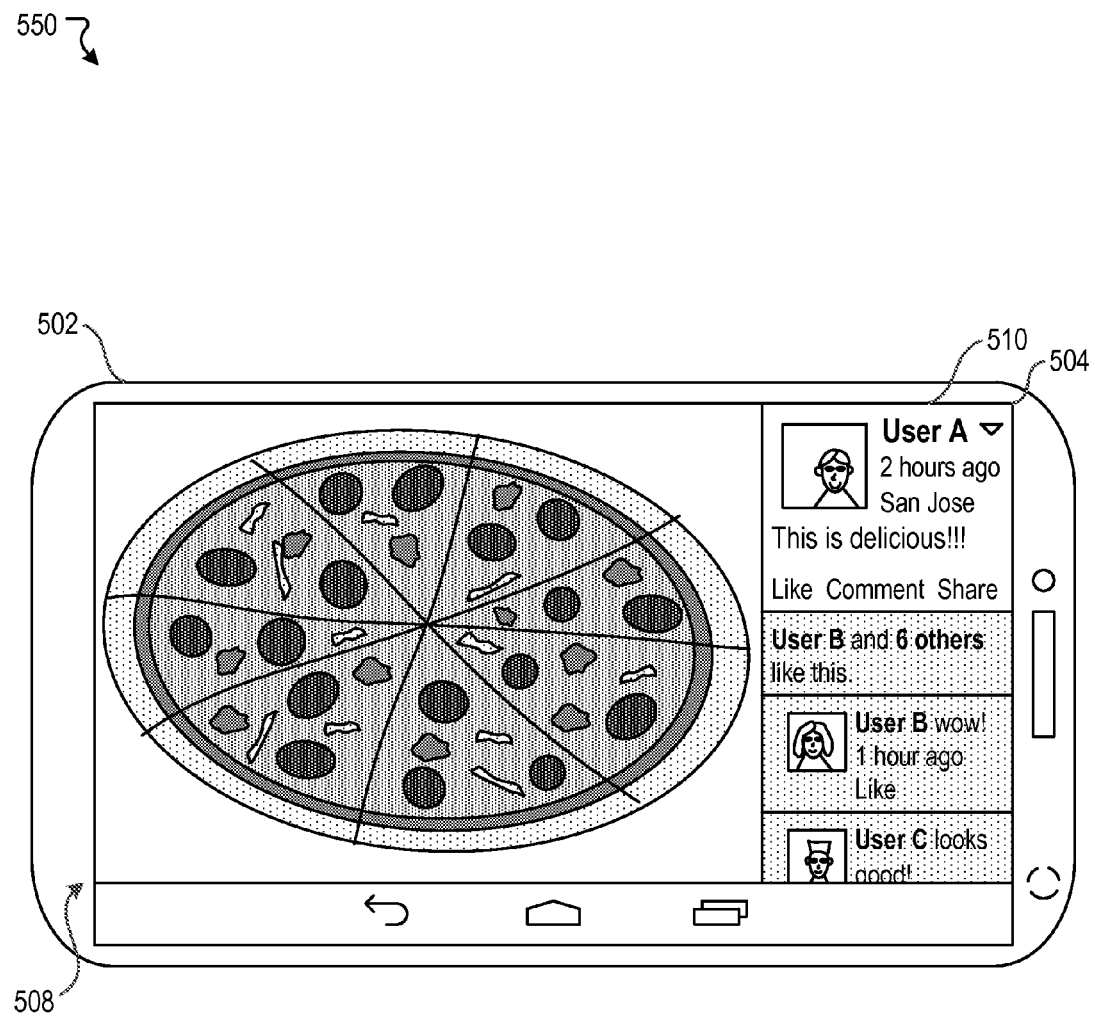
FIG. 5B illustrates an example scenario associated with providing functionality based on device orientation, according to an embodiment of the present disclosure.

FIG. 5B illustrates an example scenario 550 associated with providing functionality based on device orientation, according to an embodiment of the present disclosure. The example scenario 550 illustrates the computing system 502 of FIG. 5A having experienced a change in orientation from the first orientation to a second orientation, such as a landscape orientation. While the computing system 502 is in the second orientation, a second functionality can be provided. In this example scenario 550, the second functionality can be associated with accessing the content item (e.g., the image of the pizza) in a second view 508. As shown, the second view 508 can provide more information associated with the content item than the first view 506. For example, the second view 508 can provide a larger view of the content item. Moreover, the second view 508 can provide properties and/or metadata (e.g., comments, likes, etc.) 510 associated with the content item.

Again, it is contemplated that many variations are possible. In one example, the first functionality can be associated with a financial transaction and the second functionality can be associated with providing at least one of a receipt, a business card, or a communication expressing gratitude (e.g., a "Thank You" note). In another example, the first functionality can be associated with accessing a message in an inbox and the second functionality can be associated with providing at least one of the message, the inbox, or a message thread of which the message is a part. In a further example, the first functionality can be associated with providing a link to a web resource and the second functionality can be associated with initiating a loading of the web resource via the link (e.g., accessing the link to present the web resource).

Figure 6A:
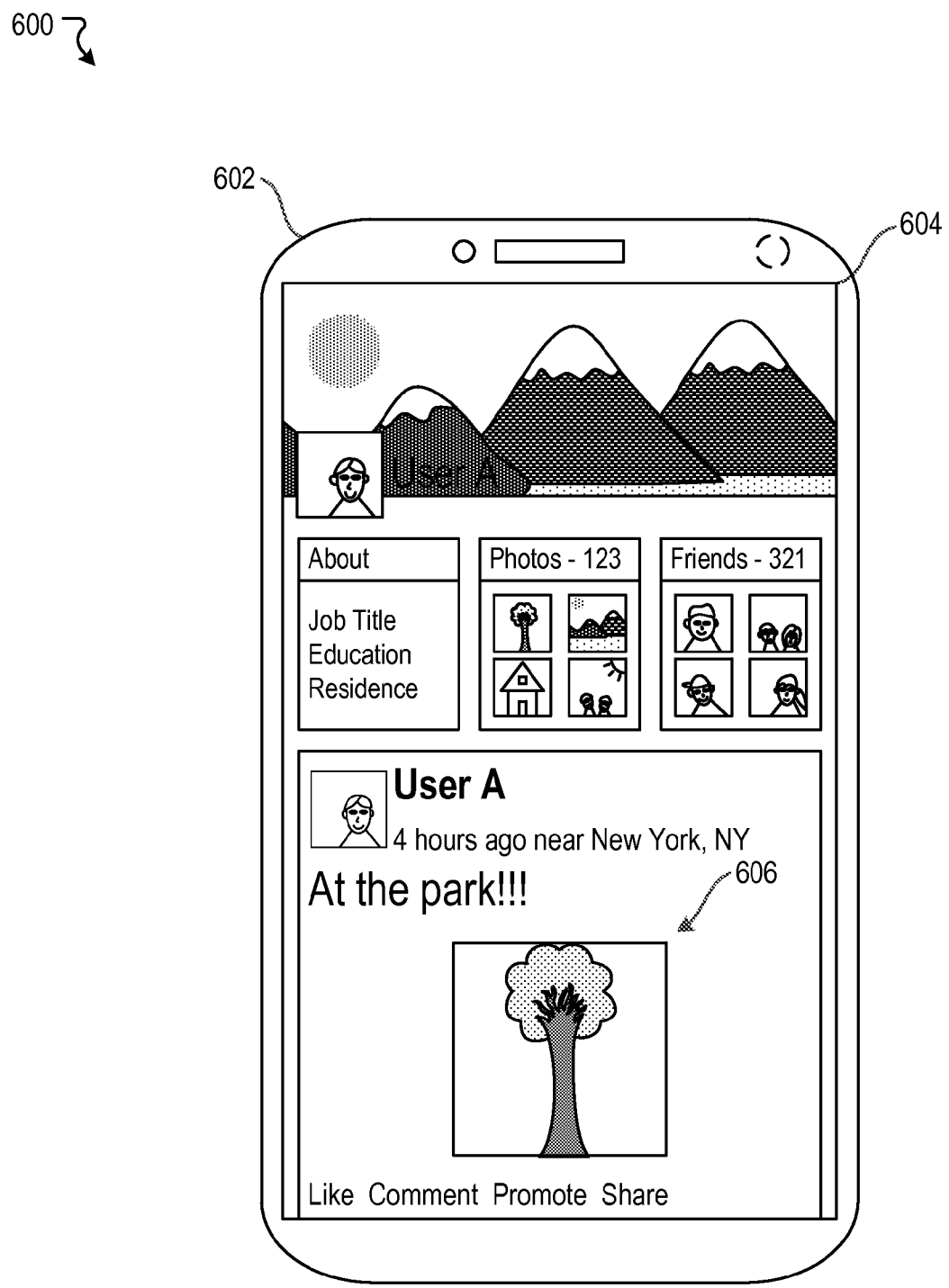
FIG. 6A illustrates an example scenario associated with providing functionality based on device orientation, according to an embodiment of the present disclosure.

FIG. 6A illustrates an example scenario 600 associated with providing functionality based on device orientation, according to an embodiment of the present disclosure. The example scenario 600 can include an example computing system 602 with a display screen 604. The computing system 602 can provide a first functionality while in a first orientation, such as a portrait orientation. In this example scenario 600, the first functionality can be associated with accessing a first content item (e.g., an image of a tree) in a first view 606.

Figure 6B:
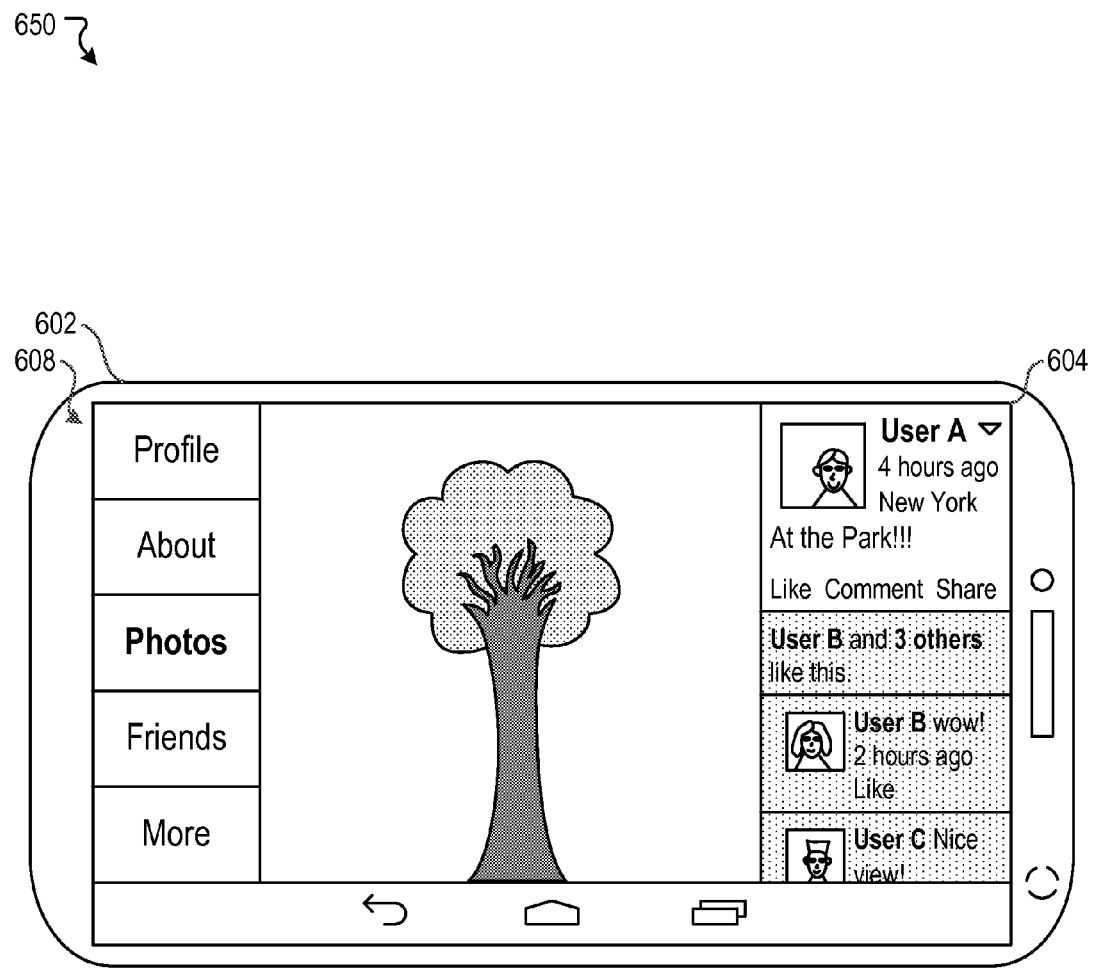
FIG. 6B illustrates an example scenario associated with providing functionality based on device orientation, according to an embodiment of the present disclosure.

FIG. 6B illustrates an example scenario 650 associated with providing functionality based on device orientation, according to an embodiment of the present disclosure. The example scenario 650 illustrates the computing system 602 of FIG. 6A having experienced a change in orientation from the first orientation to a second orientation, such as a landscape orientation. While the computing system 602 is in the second orientation, a second functionality can be provided. In this example scenario 650, the second functionality can be associated with providing, on the display screen 604, the first content item (e.g., the image of the tree) and at least one tab 608 for switching to a second view to access a second content item.

Furthermore, although not explicitly illustrated, in some embodiments, the first functionality can be associated with a search and the second functionality can be associated with providing a set of results based on the search. The providing of the set of results can include providing at least a first subset of results associated with a first search result type and a second subset of results associated with a second search result type. In some cases, one or more tabs for switching among the subsets can be provided in conjunction with the second functionality. It is appreciated there can be many other possibilities and variations.

Figure 7:
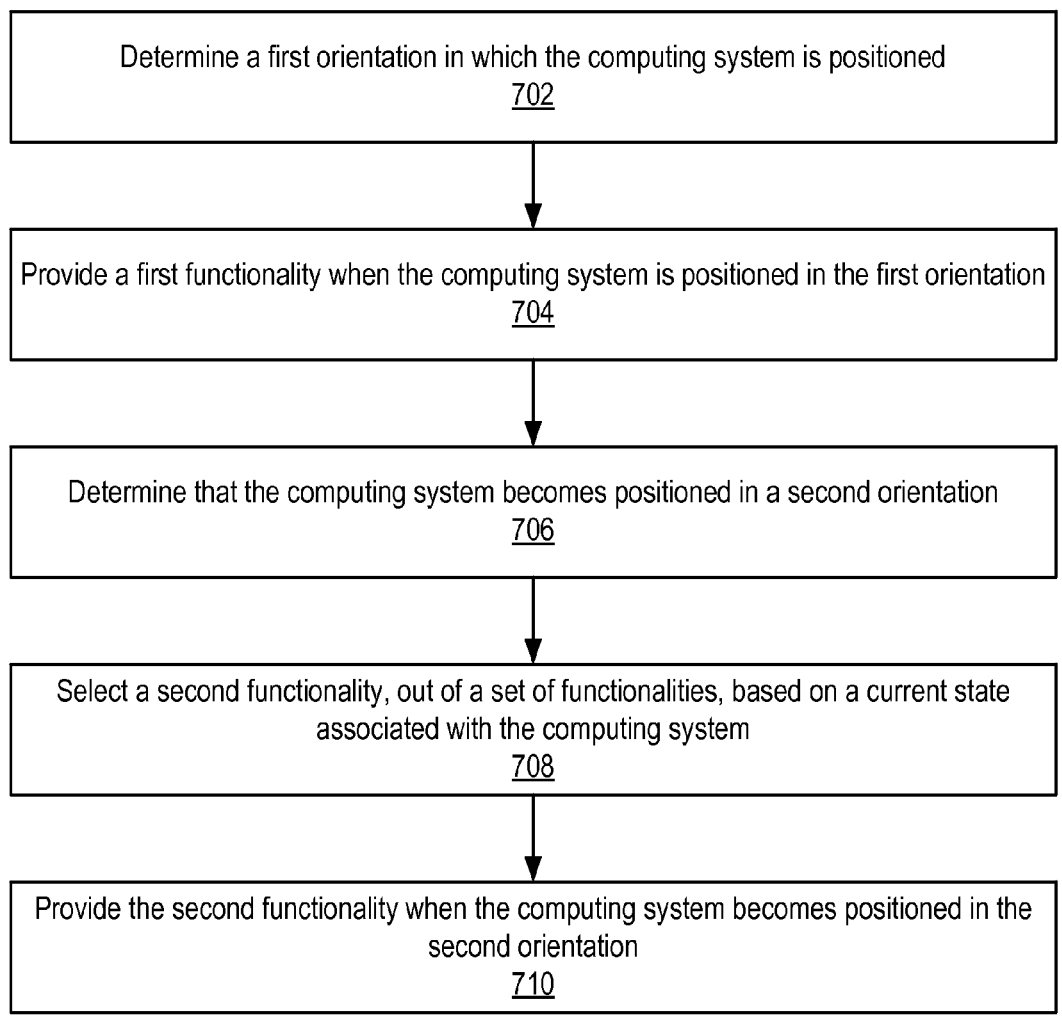
FIG. 7 illustrates an example method associated with providing functionality based on device orientation, according to an embodiment of the present disclosure.

FIG. 7 illustrates an example method 700 associated with providing functionality based on device orientation, according to an embodiment of the present disclosure. It should be appreciated that there can be additional, fewer, or alternative steps performed in similar or alternative orders, or in parallel, within the scope of the various embodiments unless otherwise stated.

At block 702, the example method 700 can determine a first orientation in which the computing system is positioned. In one example, the first orientation can include a portrait orientation, or alternatively, a landscape orientation. At block 704, the example method 700 can provide a first functionality when the computing system is positioned in the first orientation.

At block 706, the example method 700 can determine that the computing system becomes positioned in a second orientation. The method 700 can detect a change in orientation experienced by the computing system, which results in the computing system becoming positioned in the second orientation rather than in the first orientation. For example, the example method 700 can determine that the computing system becomes positioned in the landscape orientation subsequent to being in the portrait orientation, or alternatively, that the computing system becomes positioned in the portrait orientation subsequent to being in the landscape orientation.

At block 708, the example method 700 can select a second functionality, out of a set of functional ities, based on a current state associated with the computing system. In some cases, the current state associated with the computing system can include a current context of an application and/or an operating system running on the computing system. At block 710, the example method 700 can provide the second functionality when the computing system becomes positioned in the second orientation.

Figure 8:
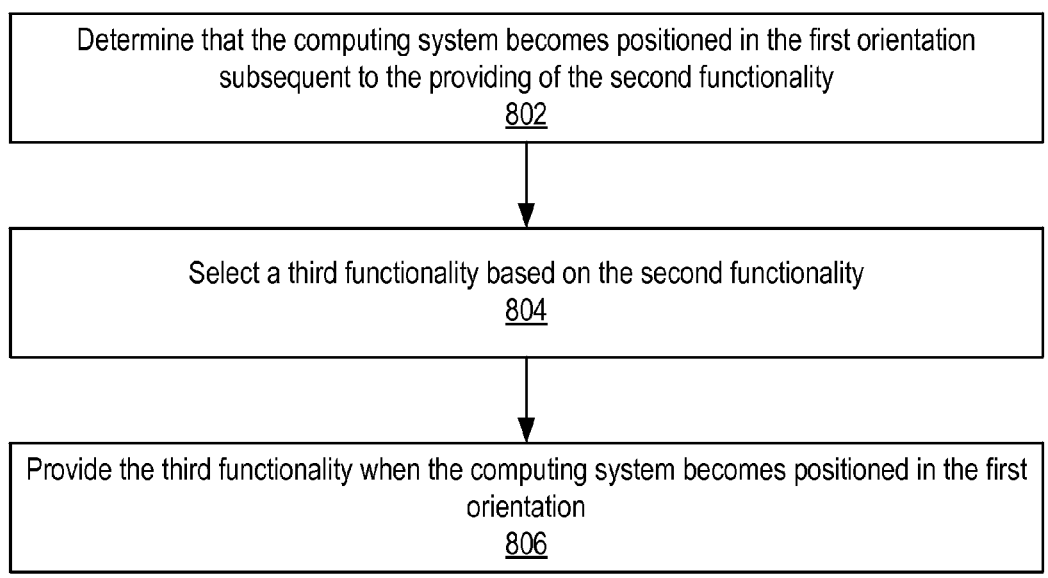
FIG. 8 illustrates an example method associated with providing functionality based on device orientation, according to an embodiment of the present disclosure.

FIG. 8 illustrates an example method 800 associated with providing functionality based on device orientation, according to an embodiment of the present disclosure. Again, it should be appreciated that there can be additional, fewer, or alternative steps performed in similar or alternative orders, or in parallel, within the scope of the various embodiments unless otherwise stated.

At block 802, the example method 800 can determine that the computing system becomes positioned in the first orientation subsequent to the providing of the second functionality. At block 804, the example method 800 can select a third functionality based on the second functionality. At block 806, the example method 800 can provide the third functionality when the computing system becomes positioned in the first orientation subsequent to the providing of the second functionality.

In some embodiments, the third functionality can be associated with initiating a loading of an image, produced in a camera mode associated with the second functionality, to be included in a post to a social networking system. In some instances, a creation of the post can be initiated based on the first functionality. For example, the post can be created as part of the first functionality provided when the computing system was in the first orientation. The image can be produced in the camera mode provided as part of the second functionality when the computing system was in the second orientation. As part of the third functionality, the image can be loaded as an inclusion or attachment to the post when the computing system reverts back to the first orientation.

Moreover, in some embodiments, the third functionality can be associated with at least one of a back instruction, a cancel instruction, an ignore instruction, a quit instruction, an escape instruction, or an exit instruction. In some cases, the third functionality can be set by default and/or by a user.

Furthermore, in some embodiments, one or more functionalities associated with content consumption and one or more functionalities associated with content production can be provided separately or in any combination.

Again, it is contemplated that there can be many other uses, applications, and/or variations associated with the various embodiments of the present disclosure. For example, various embodiments of the present disclosure can learn, improve, and/or be refined over time.

Social Networking System—Example Implementation

Figure 9:
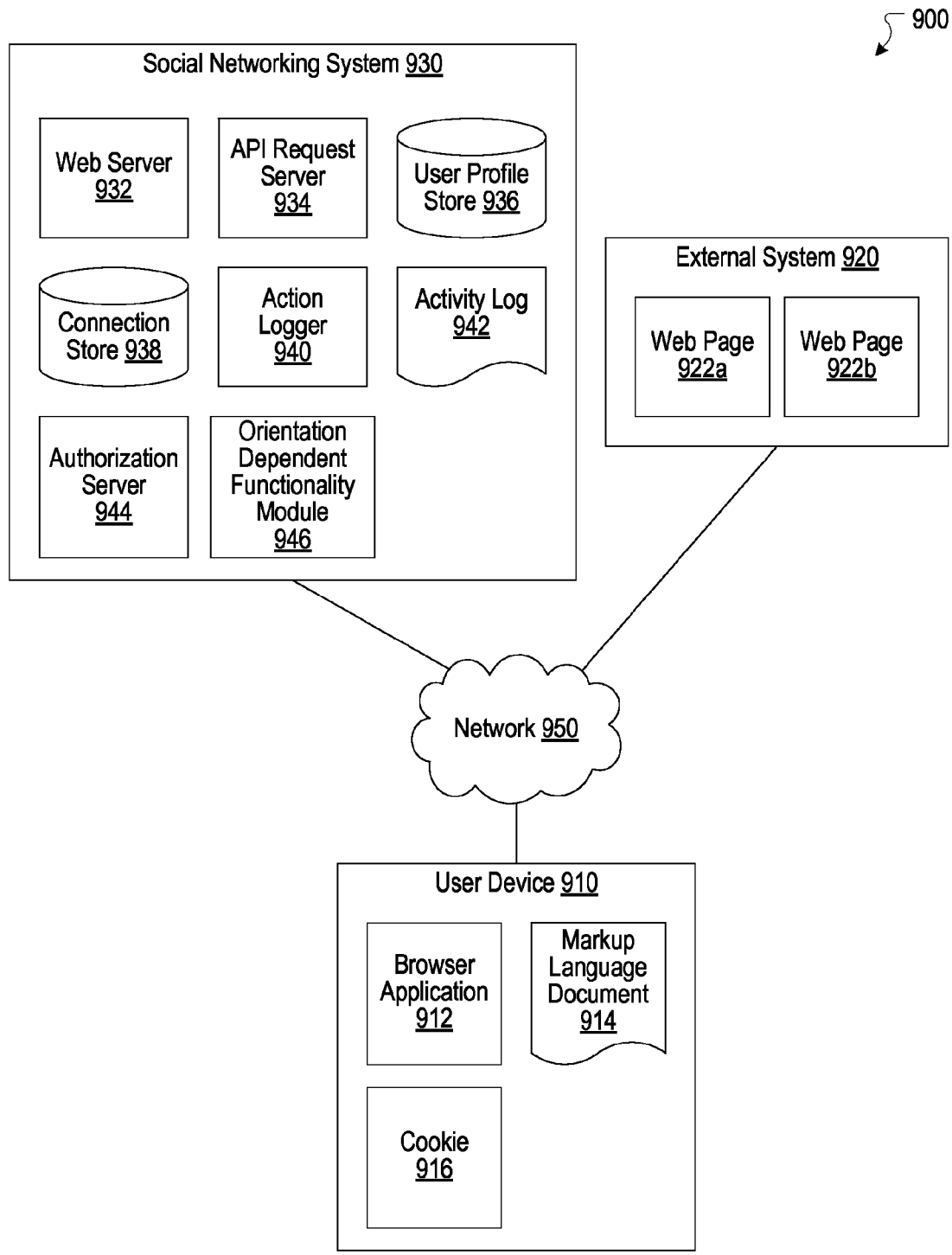
FIG. 9 illustrates a network diagram of an example system that can be utilized in various scenarios, according to an embodiment of the present disclosure.

FIG. 9 illustrates a network diagram of an example system 900 that can be utilized in various embodiments for enhanced video encoding, in accordance with an embodiment of the present disclosure. The system 900 includes one or more user devices 910, one or more external systems 920, a social networking system (or service) 930, and a network 950. In an embodiment, the social networking service, provider, and/or system discussed in connection with the embodiments described above may be implemented as the social networking system 930. For purposes of illustration, the embodiment of the system 900, shown by FIG. 9, includes a single external system 920 and a single user device 910. However, in other embodiments, the system 900 may include more user devices 910 and/or more external systems 920. In certain embodiments, the social networking system 930 is operated by a social network provider, whereas the external systems 920 are separate from the social networking system 930 in that they may be operated by different entities. In various embodiments, however, the social networking system 930 and the external systems 920 operate in conjunction to provide social networking services to users (or members) of the social networking system 930. In this sense, the social networking system 930 provides a platform or backbone, which other systems, such as external systems 920, may use to provide social networking services and functionalities to users across the Internet.

The user device 910 comprises one or more computing devices that can receive input from a user and transmit and receive data via the network 950. In one embodiment, the user device 910 is a conventional computer system executing, for example, a Microsoft Windows compatible operating system (OS), Apple OS X, and/or a Linux distribution. In another embodiment, the user device 910 can be a device having computer functionality, such as a smart-phone, a tablet, a personal digital assistant (PDA), a mobile telephone, etc. The user device 910 is configured to communicate via the network 950. The user device 910 can execute an application, for example, a browser application that allows a user of the user device 910 to interact with the social networking system 930. In another embodiment, the user device 910 interacts with the social networking system 930 through an application programming interface (API) provided by the native operating system of the user device 910, such as iOS and ANDROID. The user device 910 is configured to communicate with the external system 920 and the social networking system 930 via the network 950, which may comprise any combination of local area and/or wide area networks, using wired and/or wireless communication systems.

In one embodiment, the network 950 uses standard communications technologies and protocols. Thus, the network 950 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 950 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 950 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 910 may display content from the external system 920 and/or from the social networking system 930 by processing a markup language document 914 received from the external system 920 and from the social networking system 930 using a browser application 912. The markup language document 914 identifies content and one or more instructions describing formatting or presentation of the content. By executing the instructions included in the markup language document 914, the browser application 912 displays the identified content using the format or presentation described by the markup language document 914. For example, the markup language document 914 includes instructions for generating and displaying a web page having multiple frames that include text and/or image data retrieved from the external system 920 and the social networking system 930. In various embodiments, the markup language document 914 comprises a data file including extensible markup language (XML) data, extensible hypertext markup language (XHTML) data, or other markup language data. Additionally, the markup language document 914 may include JavaScript Object Notation (JSON) data, JSON with padding (JSONP), and JavaScript data to facilitate data-interchange between the external system 920 and the user device 910. The browser application 912 on the user device 910 may use a JavaScript compiler to decode the markup language document 914.

The markup language document 914 may also include, or link to, applications or application frameworks such as FLASH™ or Unity™ applications, the SilverLight™ application framework, etc.

In one embodiment, the user device 910 also includes one or more cookies 916 including data indicating whether a user of the user device 910 is logged into the social networking system 930, which may enable modification of the data communicated from the social networking system 930 to the user device 910.

The external system 920 includes one or more web servers that include one or more web pages 922a, 922b, which are communicated to the user device 910 using the network 950. The external system 920 is separate from the social networking system 930. For example, the external system 920 is associated with a first domain, while the social networking system 930 is associated with a separate social networking domain. Web pages 922a, 922b, included in the external system 920, comprise markup language documents 914 identifying content and including instructions specifying formatting or presentation of the identified content.

The social networking system 930 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 930 may be administered, managed, or controlled by an operator. The operator of the social networking system 930 may be a human being, an automated application, or a series of applications for managing content, regulating policies, and collecting usage metrics within the social networking system 930. Any type of operator may be used.

Users may join the social networking system 930 and then add connections to any number of other users of the social networking system 930 to whom they desire to be connected. As used herein, the term "friend" refers to any other user of the social networking system 930 to whom a user has formed a connection, association, or relationship via the social networking system 930. For example, in an embodiment, if users in the social networking system 930 are represented as nodes in the social graph, the term "friend" can refer to an edge formed between and directly connecting two user nodes.

Connections may be added explicitly by a user or may be automatically created by the social networking system 930 based on common characteristics of the users (e.g., users who are alumni of the same educational institution). For example, a first user specifically selects a particular other user to be a friend. Connections in the social networking system 930 are usually in both directions, but need not be, so the terms "user" and "friend" depend on the frame of reference. Connections between users of the social networking system 930 are usually bilateral ("two-way"), or "mutual," but connections may also be unilateral, or "one-way." For example, if Bob and Joe are both users of the social networking system 930 and connected to each other, Bob and Joe are each other's connections. If, on the other hand, Bob wishes to connect to Joe to view data communicated to the social networking system 930 by Joe, but Joe does not wish to form a mutual connection, a unilateral connection may be established. The connection between users may be a direct connection; however, some embodiments of the social networking system 930 allow the connection to be indirect via one or more levels of connections or degrees of separation.

In addition to establishing and maintaining connections between users and allowing interactions between users, the social networking system 930 provides users with the ability to take actions on various types of items supported by the social networking system 930. These items may include groups or networks (i.e., social networks of people, entities, and concepts) to which users of the social networking system 930 may belong, events or calendar entries in which a user might be interested, computer-based applications that a user may use via the social networking system 930, transactions that allow users to buy or sell items via services provided by or through the social networking system 930, and interactions with advertisements that a user may perform on or off the social networking system 930. These are just a few examples of the items upon which a user may act on the social networking system 930, and many others are possible. A user may interact with anything that is capable of being represented in the social networking system 930 or in the external system 920, separate from the social networking system 930, or coupled to the social networking system 930 via the network 950.

The social networking system 930 is also capable of linking a variety of entities. For example, the social networking system 930 enables users to interact with each other as well as external systems 920 or other entities through an API, a web service, or other communication channels. The social networking system 930 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 930. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 930 modifies edges connecting the various nodes to reflect the relationships and interactions.

The social networking system 930 also includes user-generated content, which enhances a user's interactions with the social networking system 930. User-generated content may include anything a user can add, upload, send, or "post" to the social networking system 930. For example, a user communicates posts to the social networking system 930 from a user device 910. Posts may include data such as status updates or other textual data, location information, images such as photos, videos, links, music or other similar data and/or media. Content may also be added to the social networking system 930 by a third party. Content "items" are represented as objects in the social networking system 930. In this way, users of the social networking system 930 are encouraged to communicate with each other by posting text and content items of various types of media through various communication channels. Such communication increases the interaction of users with each other and increases the frequency with which users interact with the social networking system 930.

The social networking system 930 includes a web server 932, an API request server 934, a user profile store 936, a connection store 938, an action logger 940, an activity log 942, and an authorization server 944. In an embodiment of the invention, the social networking system 930 may include additional, fewer, or different components for various applications. Other components, such as network interfaces, security mechanisms, load balancers, failover servers, management and network operations consoles, and the like are not shown so as to not obscure the details of the system.

The user profile store 936 maintains information about user accounts, including biographic, demographic, and other types of descriptive information, such as work experience, educational history, hobbies or preferences, location, and the like that has been declared by users or inferred by the social networking system 930. This information is stored in the user profile store 936 such that each user is uniquely identified. The social networking system 930 also stores data describing one or more connections between different users in the connection store 938. The connection information may indicate users who have similar or common work experience, group memberships, hobbies, or educational history. Additionally, the social networking system 930 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 930, such as non-person entities, buckets, cluster centers, images, interests, pages, external systems, concepts, and the like are also stored in the connection store 938.

The social networking system 930 maintains data about objects with which a user may interact. To maintain this data, the user profile store 936 and the connection store 938 store instances of the corresponding type of objects maintained by the social networking system 930. Each object type has information fields that are suitable for storing information appropriate to the type of object. For example, the user profile store 936 contains data structures with fields suitable for describing a user's account and information related to a user's account. When a new object of a particular type is created, the social networking system 930 initializes a new data structure of the corresponding type, assigns a unique object identifier to it, and begins to add data to the object as needed. This might occur, for example, when a user becomes a user of the social networking system 930, the social networking system 930 generates a new instance of a user profile in the user profile store 936, assigns a unique identifier to the user account, and begins to populate the fields of the user account with information provided by the user.

The connection store 938 includes data structures suitable for describing a user's connections to other users, connections to external systems 920 or connections to other entities. The connection store 938 may also associate a connection type with a user's connections, which may be used in conjunction with the user's privacy setting to regulate access to information about the user. In an embodiment of the invention, the user profile store 936 and the connection store 938 may be implemented as a federated database.

Data stored in the connection store 938, the user profile store 936, and the activity log 942 enables the social networking system 930 to generate the social graph that uses nodes to identify various objects and edges connecting nodes to identify relationships between different objects. For example, if a first user establishes a connection with a second user in the social networking system 930, user accounts of the first user and the second user from the user profile store 936 may act as nodes in the social graph. The connection between the first user and the second user stored by the connection store 938 is an edge between the nodes associated with the first user and the second user. Continuing this example, the second user may then send the first user a message within the social networking system 930. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 930 (or, alternatively, in an image maintained by another system outside of the social networking system 930). The image may itself be represented as a node in the social networking system 930. This tagging action may create edges between the first user and the second user as well as create an edge between each of the users and the image, which is also a node in the social graph. In yet another example, if a user confirms attending an event, the user and the event are nodes obtained from the user profile store 936, where the attendance of the event is an edge between the nodes that may be retrieved from the activity log 942. By generating and maintaining the social graph, the social networking system 930 includes data describing many different types of objects and the interactions and connections among those objects, providing a rich source of socially relevant information.

The web server 932 links the social networking system 930 to one or more user devices 910 and/or one or more external systems 920 via the network 950. The web server 932 serves web pages, as well as other web-related content, such as Java, JavaScript, Flash, XML, and so forth. The web server 932 may include a mail server or other messaging functionality for receiving and routing messages between the social networking system 930 and one or more user devices 910. The messages can be instant messages, queued messages (e.g., email), text and SMS messages, or any other suitable messaging format.

The API request server 934 allows one or more external systems 920 and user devices 910 to call access information from the social networking system 930 by calling one or more API functions. The API request server 934 may also allow external systems 920 to send information to the social networking system 930 by calling APIs. The external system 920, in one embodiment, sends an API request to the social networking system 930 via the network 950, and the API request server 934 receives the API request. The API request server 934 processes the request by calling an API associated with the API request to generate an appropriate response, which the API request server 934 communicates to the external system 920 via the network 950. For example, responsive to an API request, the API request server 934 collects data associated with a user, such as the user's connections that have logged into the external system 920, and communicates the collected data to the external system 920. In another embodiment, the user device 910 communicates with the social networking system 930 via APIs in the same manner as external systems 920.

The action logger 940 is capable of receiving communications from the web server 932 about user actions on and/or off the social networking system 930. The action logger 940 populates the activity log 942 with information about user actions, enabling the social networking system 930 to discover various actions taken by its users within the social networking system 930 and outside of the social networking system 930. Any action that a particular user takes with respect to another node on the social networking system 930 may be associated with each user's account, through information maintained in the activity log 942 or in a similar database or other data repository. Examples of actions taken by a user within the social networking system 930 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 930, the action is recorded in the activity log 942. In one embodiment, the social networking system 930 maintains the activity log 942 as a database of entries. When an action is taken within the social networking system 930, an entry for the action is added to the activity log 942. The activity log 942 may be referred to as an action log.

Additionally, user actions may be associated with concepts and actions that occur within an entity outside of the social networking system 930, such as an external system 920 that is separate from the social networking system 930. For example, the action logger 940 may receive data describing a user's interaction with an external system 920 from the web server 932. In this example, the external system 920 reports a user's interaction according to structured actions and objects in the social graph.

Other examples of actions where a user interacts with an external system 920 include a user expressing an interest in an external system 920 or another entity, a user posting a comment to the social networking system 930 that discusses an external system 920 or a web page 922a within the external system 920, a user posting to the social networking system 930 a Uniform Resource Locator (URL) or other identifier associated with an external system 920, a user attending an event associated with an external system 920, or any other action by a user that is related to an external system 920. Thus, the activity log 942 may include actions describing interactions between a user of the social networking system 930 and an external system 920 that is separate from the social networking system 930.

The authorization server 944 enforces one or more privacy settings of the users of the social networking system 930. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 920, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 920. One embodiment allows the specification of the set of entities to comprise an enumeration of entities. For example, the user may provide a list of external systems 920 that are allowed to access certain information. Another embodiment allows the specification to comprise a set of entities along with exceptions that are not allowed to access the information. For example, a user may allow all external systems 920 to access the user's work information, but specify a list of external systems 920 that are not allowed to access the work information. Certain embodiments call the list of exceptions that are not allowed to access certain information a "block list". External systems 920 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 944 contains logic to determine if certain information associated with a user can be accessed by a user's friends, external systems 920, and/or other applications and entities. The external system 920 may need authorization from the authorization server 944 to access the user's more private and sensitive information, such as the user's work phone number. Based on the user's privacy settings, the authorization server 944 determines if another user, the external system 920, an application, or another entity is allowed to access information associated with the user, including information about actions taken by the user.

In some embodiments, the social networking system 930 can include an orientation dependent functionality module 946. The orientation dependent functionality module 946 can, for example, be implemented as the orientation dependent functionality 102 of FIG. 1. The orientation dependent functionality module 946 can be configured to facilitate determining a first orientation in which a computing system is positioned. The orientation dependent functionality module 946 can be configured to facilitate providing a first functionality when the computing system is positioned in the first orientation. The orientation dependent functionality module 946 can also be configured to facilitate determining that the computing system becomes positioned in a second orientation. The orientation dependent functionality module 946 can further be configured to facilitate selecting a second functionality, out of a set of functionalities, based on a current state associated with the computing system. Moreover, the orientation dependent functionality module 946 can be configured to facilitate providing the second functionality when the computing system becomes positioned in the second orientation.

Hardware Implementation

Figure 10:
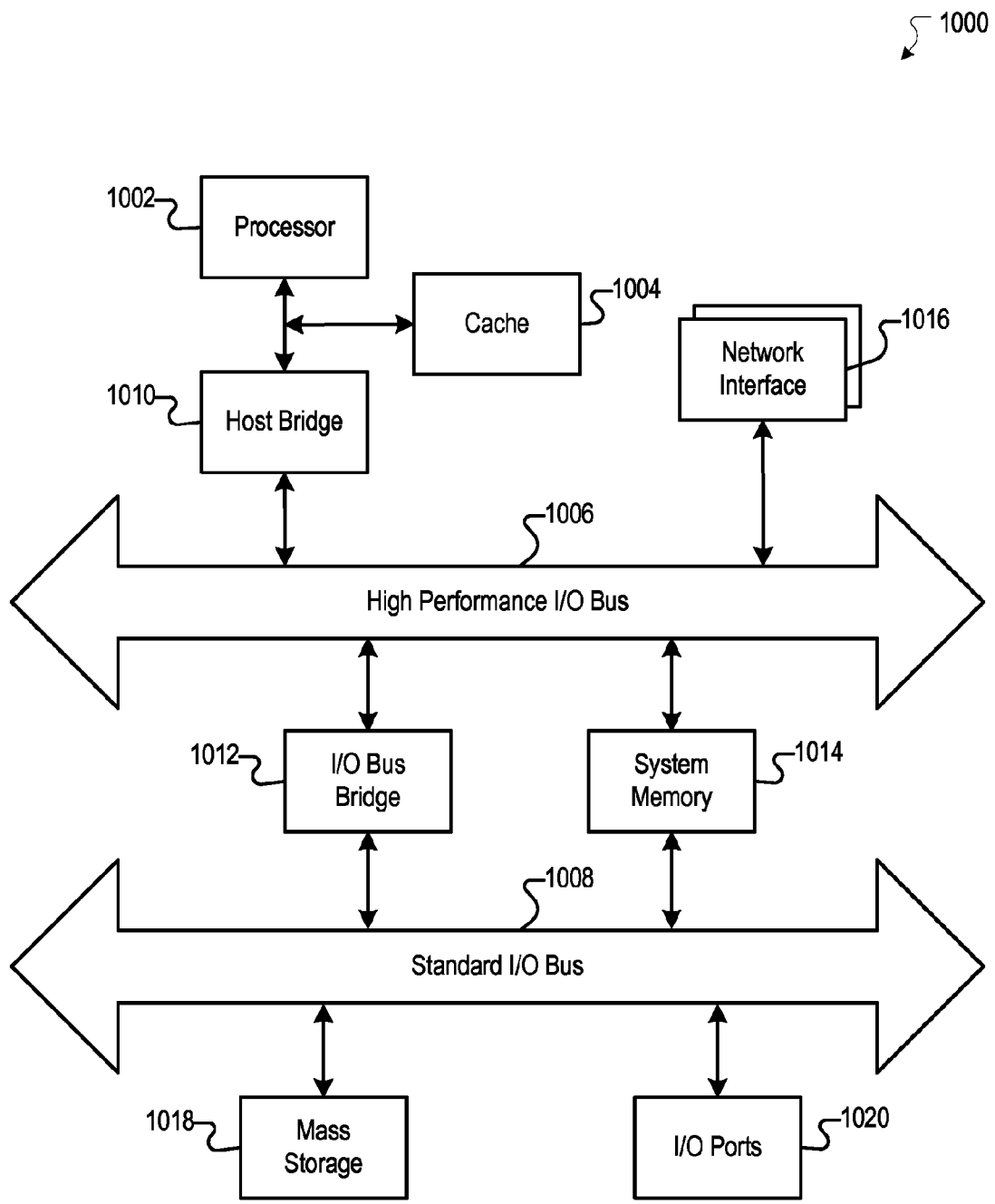
FIG. 10 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 10 illustrates an example of a computer system 1000 that may be used to implement one or more of the embodiments described herein in accordance with an embodiment of the invention. The computer system 1000 includes sets of instructions for causing the computer system 1000 to perform the processes and features discussed herein. The computer system 1000 may be connected (e.g., networked) to other machines. In a networked deployment, the computer system 1000 may operate in the capacity of a server machine or a client machine in a client-server network environment, or as a peer machine in a peer-to-peer (or distributed) network environment. In an embodiment of the invention, the computer system 1000 may be the social networking system 930, the user device 910, and the external system 1020, or a component thereof. In an embodiment of the invention, the computer system 1000 may be one server among many that constitutes all or part of the social networking system 930.

The computer system 1000 includes a processor 1002, a cache 1004, and one or more executable modules and drivers, stored on a computer-readable medium, directed to the processes and features described herein. Additionally, the computer system 1000 includes a high performance input/output (I/O) bus 1006 and a standard I/O bus 1008. A host bridge 1010 couples processor 1002 to high performance I/O bus 1006, whereas I/O bus bridge 1012 couples the two buses 1006 and 1008 to each other. A system memory 1014 and one or more network interfaces 1016 couple to high performance I/O bus 1006. The computer system 1000 may further include video memory and a display device coupled to the video memory (not shown). Mass storage 1018 and I/O ports 1020 couple to the standard I/O bus 1008. The computer system 1000 may optionally include a keyboard and pointing device, a display device, or other input/output devices (not shown) coupled to the standard I/O bus 1008. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 1000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 1000 are described in greater detail below. In particular, the network interface 1016 provides communication between the computer system 1000 and any of a wide range of networks, such as an Ethernet (e.g., IEEE 802.3) network, a backplane, etc. The mass storage 1018 provides permanent storage for the data and programming instructions to perform the above-described processes and features implemented by the respective computing systems identified above, whereas the system memory 1014 (e.g., DRAM) provides temporary storage for the data and programming instructions when executed by the processor 1002. The I/O ports 1020 may be one or more serial and/or parallel communication ports that provide communication between additional peripheral devices, which may be coupled to the computer system 1000.

The computer system 1000 may include a variety of system architectures, and various components of the computer system 1000 may be rearranged. For example, the cache 1004 may be on-chip with processor 1002. Alternatively, the cache 1004 and the processor 1002 may be packed together as a "processor module", with processor 1002 being referred to as the "processor core". Furthermore, certain embodiments of the invention may neither require nor include all of the above components. For example, peripheral devices coupled to the standard I/O bus 1008 may couple to the high performance I/O bus 1006. In addition, in some embodiments, only a single bus may exist, with the components of the computer system 1000 being coupled to the single bus. Moreover, the computer system 1000 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 1000 that, when read and executed by one or more processors, cause the computer system 1000 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1000, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 1002. Initially, the series of instructions may be stored on a storage device, such as the mass storage 1018. However, the series of instructions can be stored on any suitable computer readable storage medium. Furthermore, the series of instructions need not be stored locally, and could be received from a remote storage device, such as a server on a network, via the network interface 1016. The instructions are copied from the storage device, such as the mass storage 1018, into the system memory 1014 and then accessed and executed by the processor 1002. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1000 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   detecting, by a computing system, a first orientation in which the computing system is positioned using one or more orientation sensors;
   providing, by the computing system, a first functionality when the computing system is positioned in the first orientation;
   detecting, by the computing system, that the computing system becomes positioned in a second orientation using the one or more orientation sensors;
   selecting, by the computing system, a second functionality, out of a set of functionalities, based on a current state associated with the computing system, wherein the first functionality and the second functionality are associated with content production of a content item, wherein the first functionality is associated with an input element for creating the content item and the second functionality is associated with capturing a media content item to be included in the content item; and providing, by the computing system, the second functionality when the computing system becomes positioned in the second orientation.

2. The computer-implemented method of claim 1, wherein the first orientation corresponds to a portrait orientation and wherein the second orientation corresponds to a landscape orientation.

3. The computer-implemented method of claim 1, wherein the current state associated with the computing system includes at least one of a current context associated with an application running on the computing system or a current context associated with an operating system running on the computing system.

4. The computer-implemented method of claim 1, wherein at least a first subset out of the set of functionalities is associated with content production, and wherein at least a second subset out of the set of functionalities is associated with content consumption.

5. The computer-implemented method of claim 1, wherein the content item is a post on a social networking system, and wherein the second functionality is associated with a camera mode for producing an image to be included in the post.

6. The computer-implemented method of claim 1, further comprising:
determining that the computing system becomes positioned in the first orientation subsequent to the providing of the second functionality;
selecting a third functionality based on the second functionality; and
providing the third functionality when the computing system becomes positioned in the first orientation subsequent to the providing of the second functionality.

7. The computer-implemented method of claim 6, wherein the third functionality is associated with initiating a loading of an image, produced in a camera mode associated with the second functionality, to be included in a post to a social networking system, and wherein a creation of the post was initiated based on the first functionality, wherein the media content item is the image and the content item is the post.

8. The computer-implemented method of claim 6, wherein the third functionality is associated with at least one of a back instruction, a cancel instruction, an ignore instruction, a quit instruction, an escape instruction, or an exit instruction.

9. The computer-implemented method of claim 1, further comprising:
determining a direction associated with a change in orientation experienced by the computing system when the computing system becomes positioned in the second orientation subsequent to being positioned in the first orientation, and wherein the selecting of the second functionality is based on the direction.

10. The computer-implemented method of claim 1, wherein the one or more orientation sensors include at least one of an accelerometer, a gyroscope, a compass, a barometer, a magnetometer, or a motion processor.

11. The computer-implemented method of claim 1, further comprising:
providing a third functionality when the computing system is positioned in the first orientation; and
providing a fourth functionality when the computing system becomes positioned in the second orientation.

12. The computer-implemented method of claim 11, wherein the third functionality is associated with an input element for creating a post on a social networking system, and wherein the fourth functionality is associated with at least one of adding a location tag to the post, adding a user tag to the post, applying facial recognition to the post, or utilizing rich-text editing for the post.

13. The computer-implemented method of claim 11, wherein the third functionality is associated with accessing a content item in a first view, wherein the fourth functionality is associated with accessing the content item in a second view, and wherein the second view provides more information associated with the content item than the first view.

14. The computer-implemented method of claim 11, wherein the third functionality is associated with a financial transaction, and wherein the fourth functionality is associated with providing at least one of a receipt, a business card, or a communication expressing gratitude.

15. The computer-implemented method of claim 11, wherein the third functionality is associated with accessing a message in an inbox, and wherein the fourth functionality is associated with providing at least one of the message, the inbox, or a message thread of which the message is a part.

16. The computer-implemented method of claim 11, wherein the third functionality is associated with providing a link to a web resource, and wherein the fourth functionality is associated with initiating a loading of the web resource via the link.

17. The computer-implemented method of claim 11, wherein the third functionality is associated with accessing a first content item in a first view, and wherein the fourth functionality is associated with providing the first content item and at least one tab for switching to a second view to access a second content item.

18. The computer-implemented method of claim 11, wherein the third functionality is associated with a search, wherein the fourth functionality is associated with providing a set of results based on the search, and wherein the providing of the set of results includes providing at least a first subset of results associated with a first search result type and a second subset of results associated with a second search result type.

19. A system comprising:
at least one processor; and
a memory storing instructions that, when executed by the at least one processor, cause the system to perform:
detecting a first orientation in which the system is positioned using one or more orientation sensors;
providing a first functionality when the system is positioned in the first orientation;
detecting that the system becomes positioned in a second orientation using the one or more orientation sensors;
selecting a second functionality, out of a set of functionalities, based on a current state associated with the system, wherein the first functionality and the second functionality are associated with content production of a content item, wherein the first functionality is associated with an input element for creating the content item and the second functionality is associated with capturing a media content item to be included in the content item; and
providing the second functionality when the system becomes positioned in the second orientation.

20. A non-transitory computer-readable storage medium including instructions that, when executed by at least one processor of a computing system, cause the computing system to perform:

detecting a first orientation in which the computing system is positioned using one or more orientation sensors;
providing a first functionality when the computing system is positioned in the first orientation;
detecting that the computing system becomes positioned in a second orientation using the one or more orientation sensors;
selecting a second functionality, out of a set of functionalities, based on a current state associated with the computing system, wherein the first functionality and the second functionality are associated with content production of a content item, wherein the first functionality is associated with an input element for creating the content item and the second functionality is associated with capturing a media content item to be included in the content item; and
providing the second functionality when the computing system becomes positioned in the second orientation.

* * * * *